May 6, 1947.  A. SELIGMANN ET AL  2,420,056
VALVE
Filed Aug. 11, 1944  4 Sheets-Sheet 1
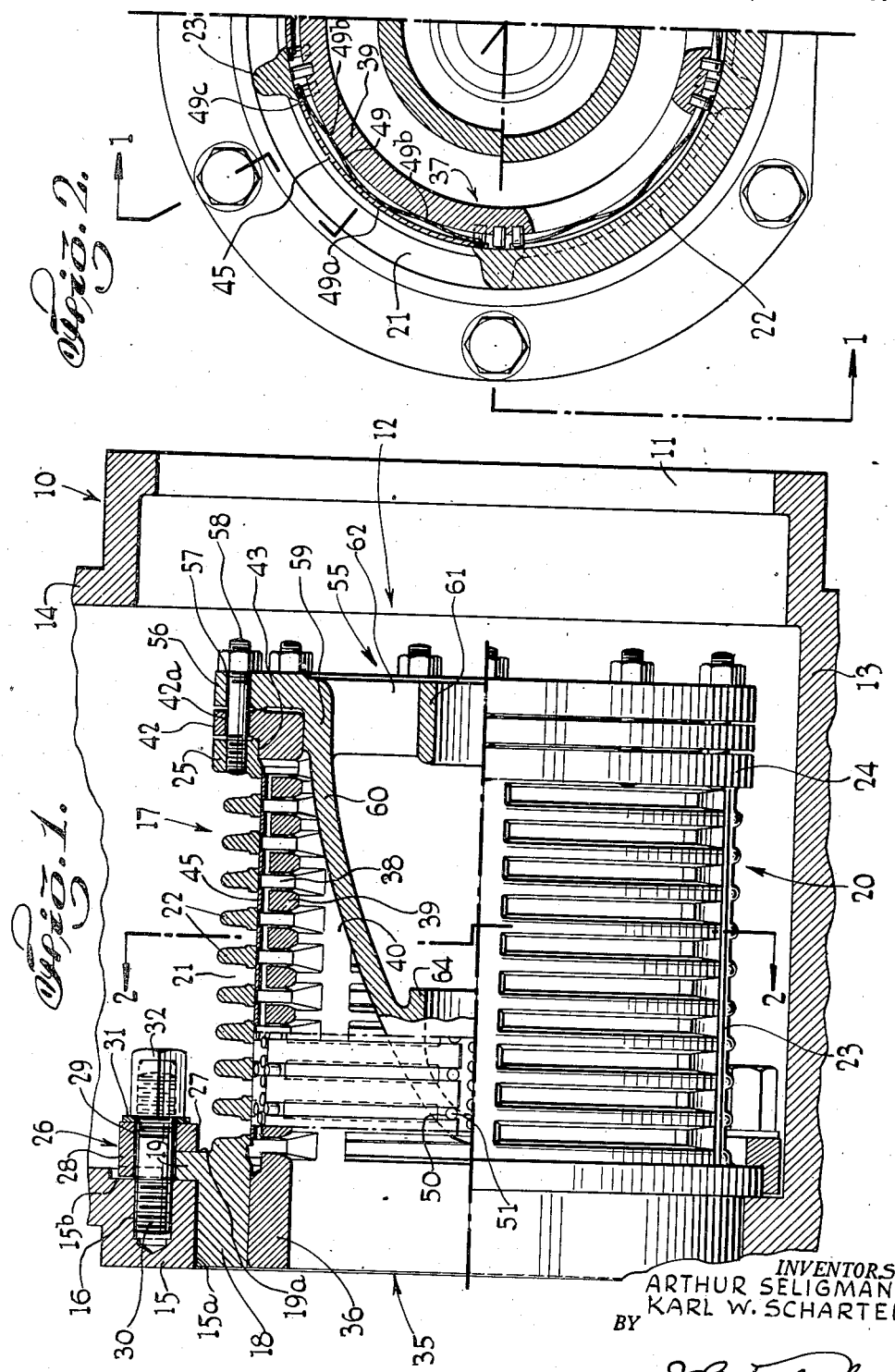
INVENTORS
ARTHUR SELIGMANN
KARL W. SCHARTEL
BY
J. B. Felsken
ATTORNEY

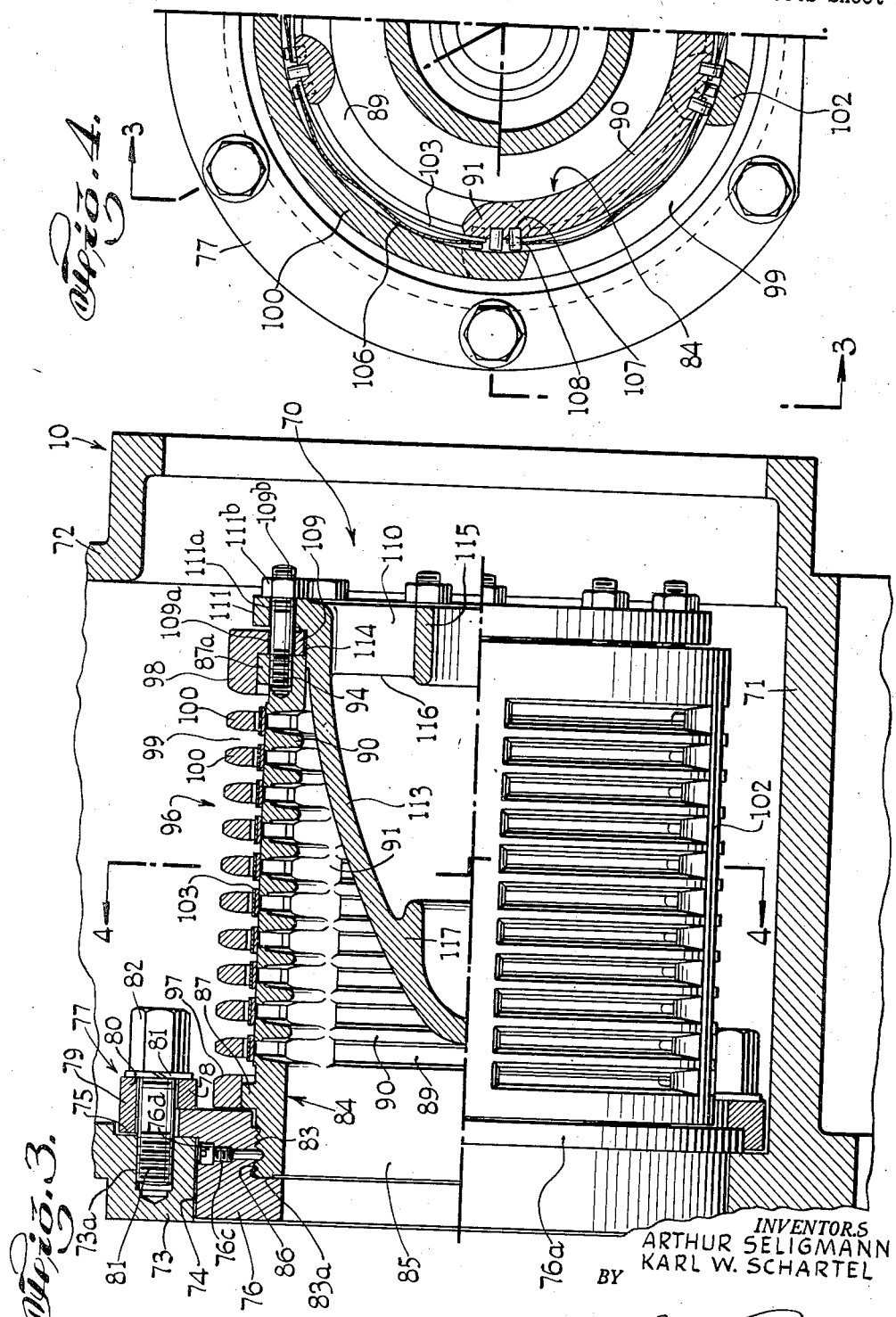

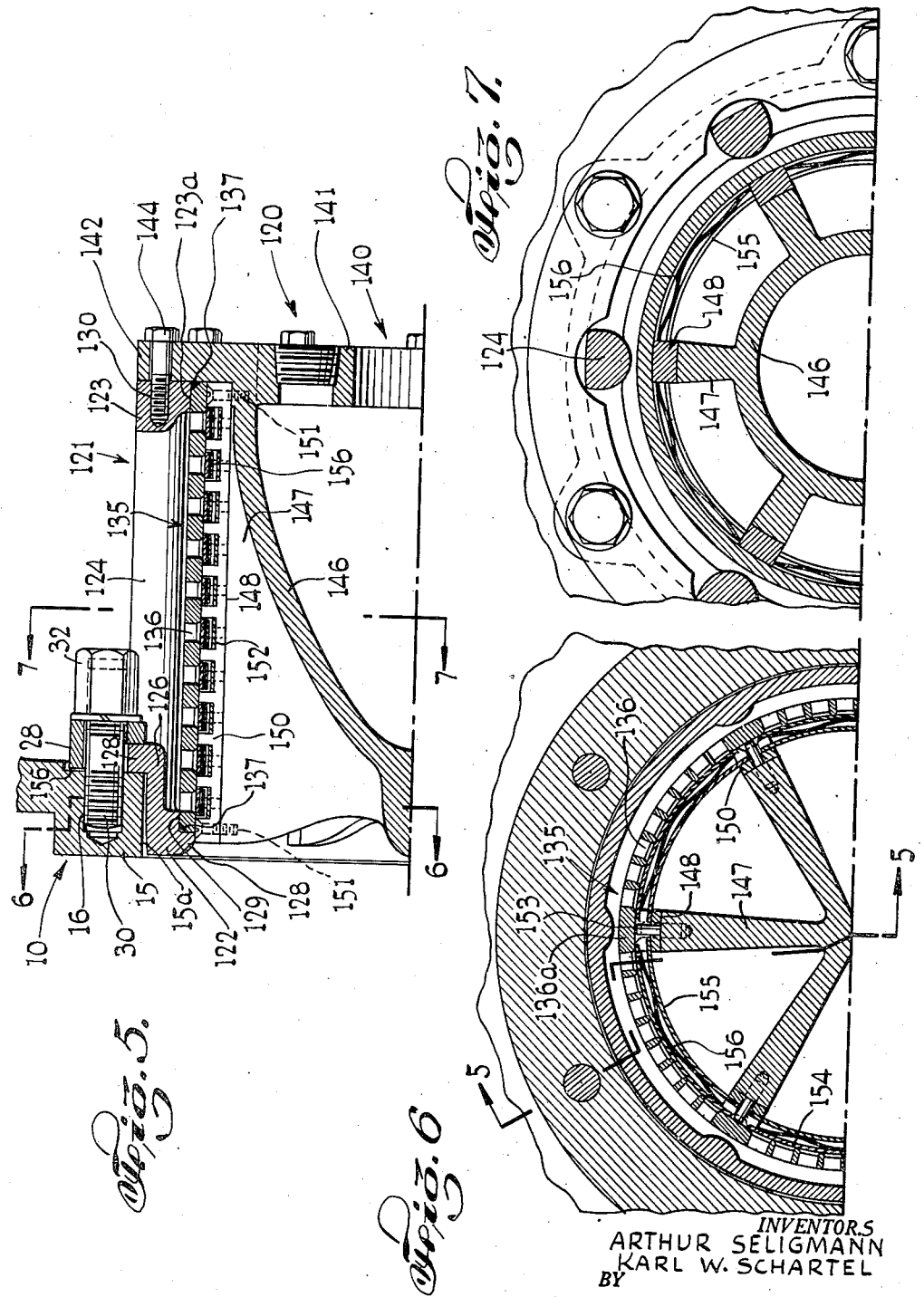

May 6, 1947.　　　A. SELIGMANN ET AL　　　2,420,056
VALVE
Filed Aug. 11, 1944　　　4 Sheets-Sheet 4
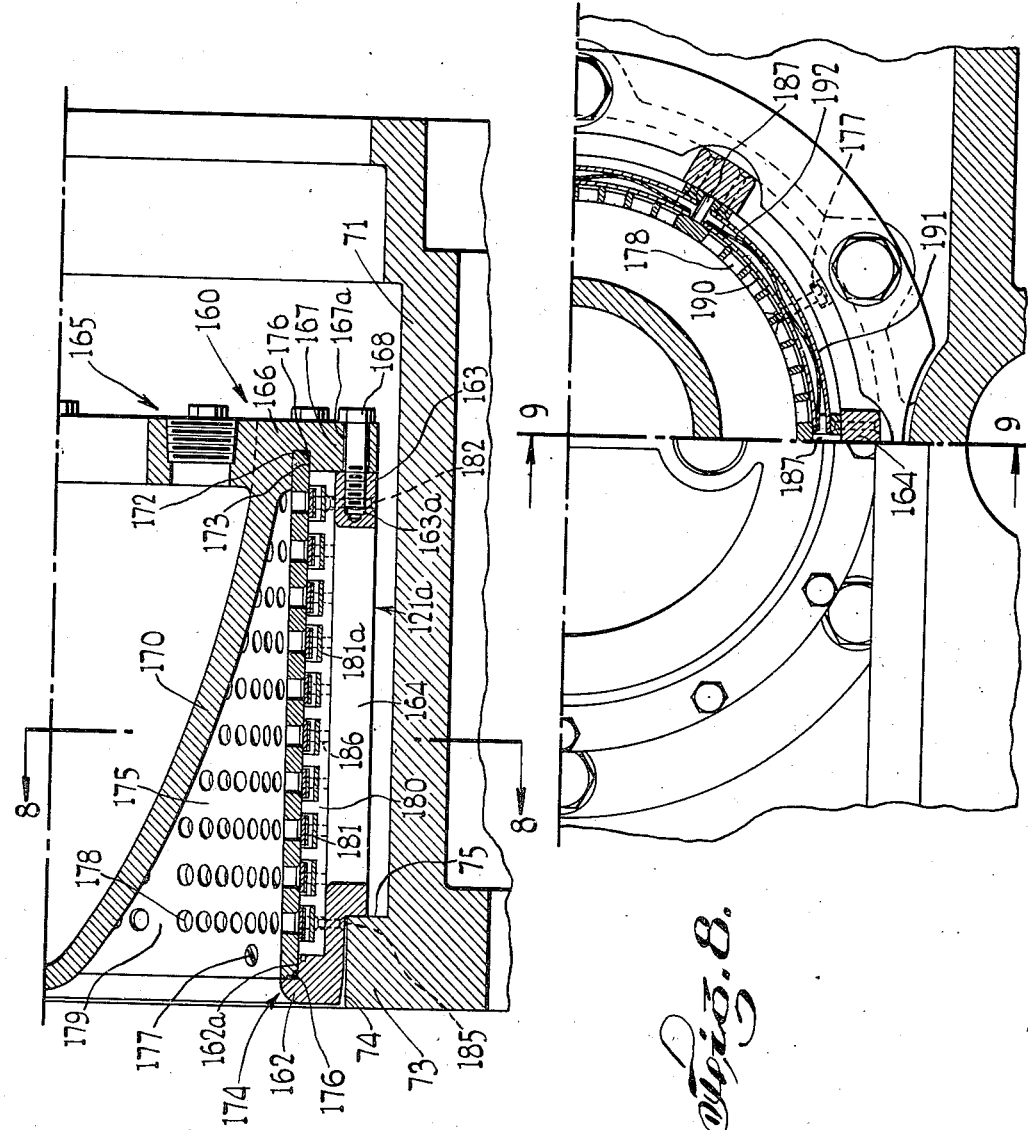
INVENTORS
ARTHUR SELIGMANN
KARL W. SCHARTEL
BY
J.B. Felshin
ATTORNEY Patented May 6, 1947

2,420,056

UNITED STATES PATENT OFFICE 2,420,056

VALVE

Arthur Seligmann, Newark, N. J., and Karl W. Schartel, New York, N. Y., assignors to J. H. H. Voss, Co., Bronx, N. Y., a partnership Application August 11, 1944, Serial No. 549,020

1 Claim. (Cl. 277—60)

This invention relates to valves. It is particularly directed to suction and discharge or delivery valves for piston compressors such as high speed air or gas compressors or the like devices.

An object of this invention is to provide a valve of the character described having arcual ribbon-type plate valves pressed by springs against cylindrical valve seats and held in place by a cylindrical valve guard.

Valve construction has been known in which there is provided a substantially cylindrical valve slot or opening forming almost a complete circle, with a spring valve closing element adapted to close the slot. Difficulty has been found with such valve construction because of the comparatively heavy single closing element which has a whiplike scraping action, severely straining its ends and causing early distortion and severe abrasions on the seating surfaces and the closing element. Furthermore, such a spring-like valve closing element did not provide for evenly divided gas flow through and around the seat and guard because such spring-like valve would not open up evenly and would cause closed crannies or recesses at the ends of the closing element resulting in accumulation of dirt, carbon, and the like, which would impede the proper valve action and cause loss of pumping efficiency by holding the closing element from its proper seat. Furthermore, since the closing element itself was a spring, tilting and twisting and destructive scraping could not be avoided. It is therefore a further object of this invention to provide a valve of the character described in which the closing elements are arcual plates provided with separate springs contacting each plate in two or more points to close said plates. The arcual plates permit the division of the circumference of the valve seat and guard surfaces into two or more arcs, each fitted with its closing element and its spring. With such construction comparatively heavy closing elements are avoided, and the valve plates do not have whiplike scraping action and are not easily distorted. Furthermore, abrasions on the valve plate and the seating surface is avoided. With such construction furthermore evenly divided gas flow is obtained through and around valve seat and valve guard. Closed crannies or recesses and accumulation of dirt and carbon is also provided, thereby insuring proper valve action and assuring proper closing of the arcs on their seats.

Furthermore, with such construction the arcual valve plates may be made of one metal most suitable for the purpose desired, whereas the springs may be made of desired spring material.

Furthermore the arcual plates may be made of a definite curvature that does not change like a a spring, and the springs may be constructed to act upon the arcual plates at two or more points, thus insuring even closure and avoiding tilting or twisting or scraping at the ends.

Another object of this invention is to provide in a valve of the character described, a cylindrical valve seat, a valve guard frame, and separate valve guards or racks mounted on the frame for locating the closing elements, its springs, and their backing plates. With such construction a better alignment of all the parts relative to the seating surfaces is assured and also permits the valve guards or racks to be made of heat-treated wear-resisting materials of higher quality and price than is necessary for the valve guard frame.

Yet another object of this invention is to provide a valve seat comprising a cylindrical tube formed with circular rows of drilled holes forming the valve openings to be closed by the arcual valve plates.

Another object of this invention is to provide a valve of the character described provided with guide pins for guiding and preventing shifting of the segmental valve plates.

Still a further object of this invention is to provide a valve structure of the character described which may be incorporated into a suction or discharge valve and with which improved valve performance is obtained, and which permits cheaper maintenance costs, and which shall yet be relatively inexpensive to manufacture, easy to assemble, and which shall be sure and positive in action and efficient and practical to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claim.

In the accompanying drawing, in which is shown one of the various possible illustrative embodiments of this invention, Fig. 1 is a cross-sectional view of a suction valve embodying the invention taken on line 1—1 of Fig. 2;

Fig. 2 is a cross-sectional view taken on line 2—2 of Fig. 1;

Fig. 3 is a cross-sectional view taken on line 3—3 of Fig. 4 and illustrating a discharge or delivery valve embodying the invention;

Fig. 4 is a cross-sectional view taken on line 4—4 of Fig. 3;

Fig. 5 is a cross-sectional view taken on line 5—5 of Fig. 6 and showing a modified form of a suction valve embodying the invention;

Fig. 6 is a cross-sectional view taken on line 6—6 of Fig. 5;

Fig. 7 is a cross-sectional view taken on line 7—7 of Fig. 5;

Fig. 8 is a cross-sectional view taken on line

8—8 of Fig. 9 and illustrating a modified form of discharge or delivery valve embodying the invention;

Fig. 9 is a cross-sectional view taken on line 9—9 of Fig. 8.

Referring now in detail to the drawing, and particularly to Figs. 1 and 2 thereof, 10 designates the valve head forming part of an air or gas compressor; and 11 designates the valve housing for a suction valve 12 embodying the invention. The housing 11 has an annular valve casing or wall 13 communicating with a gas or air inlet passage 14. At one end of the annular wall 13 is a circular flange 15 adjacent the entrance to the compressor cylinder. The flange 15 is formed with a plurality of equiangularly spaced screw threaded openings 16 on the surface 15b thereof, parallel to the axis of said flange.

Fitted within the openings 15a formed by said flange, and extending into the valve casing 13 is a valve seat member 17. The same comprises a cylindrical flange 18 received within the opening 15a, and an outwardly extending flat annular flange 19 contacting the surface 15b of flange 15, and a generally cylindrical wall 20 disposed concentrically of wall 13 and spaced therefrom. Wall 20 is formed with a plurality of circular sets of arcual slots 21 forming ribs 22 therebetween, interconnected by longitudinal webs 23. At the rear end of wall 20 is an annular flange 24 formed with a plurality of longitudinal screw threaded openings 25. It will be noted that there are five webs 23 forming five arcual slots 21 in each set.

Means is provided for attaching valve seat member 17 to flange 15. To this end there is provided a flange 26 having a flat wall 27 contacting the surface 19a of flange 19, and a shoulder 28 overlying the flange 19. Wall 27 of the flange 26 is formed with through openings 29 to receive studs 30 screwed into the screw threaded opening 16. On each stud is a lock washer 31 contacting the flange, and screwed to the outer end of each stud is a cap screw 32. Any suitable number of studs may be provided for locking member 17 rigidly to the flange 15 of the valve housing.

Telescoped within the valve seat member 17 is a valve guard member 35. The valve guard member 35 has a cylindrical end portion 36 which snugly fits within cylindrical portion 18 of the valve seat member 17. Extending from cylindrical wall 36 is a generally cylindrically shaped wall 37 formed with circular rows or sets of arcual slots 38. Between the slots 38 are formed arcual ribs 39 interconnected by longitudinal webs 40. It will be noted that the slots 38 are aligned with ribs 22, whereas the ribs 39 are aligned with the slots 21. The webs 40 of guard member 35 are in alignment with the webs 23 of the valve seat member 17. The outer surfaces of the ribs 39 are spaced from the inner surfaces of the ribs 22 and are concentric therewith for the purposes hereinafter appearing.

At the outer end of portion 37 of member 35 is an outwardly extending annular flange 42 formed with a cylindrical shoulder 43 on which rests the annular rim 24 of member 17. Flange 42 is formed with through openings 42a aligned with the openings 25 in rim 24.

Between each rib 39 and the slot 21 aligned therewith, is an arcual valve ribbon plate 45. Each arcual plate is adapted to contact the inner surfaces of the ribs 22 on opposite sides thereof to close an opening or slot 21. Interposed between each arcual plate 45 and the rib 39 aligned therewith, is a spring 49. Spring 49 may be of sinuous shape, being provided with a central humped portion 49a contacting the middle of plate 45, rearwardly curved portions 49b contacting rib 39, and end portions 49c contacting the inner surfaces of the ends of plate 45. Thus spring 49 contacts the valve plate at more than one peripheral point.

Means is provided to retain the arcual valve plates 45 and the spring 49 against side or end movement. To this end there is drilled on the outer surface of interconnecting web portions 40 of member 35, radial openings 50 in which are press-fitted radial pins 51 projecting beyond the outer surface of wall 37 and contacting the ends and side edges of the valve plates 45 and springs 49.

Fitted within the valve guard member 35 is a filler member 55. The same comprises an annular flat flange 56 contacting flange 42 and formed with through openings 57 registering with openings 42a and 25 for receiving bolts 58 which attach the filler to the valve guard member and valve seat member. The filler member 55 furthermore comprises a cylindrical portion 59 contacting the inner surface of rim 42 for centering the filler. Extending from the cylindrical wall 49 is a tapering portion 60 having the shape of the nose of a shell. The end of wall 60 is substantially aligned with the most forward row of circular slots 21. At the rear end of the filler is a central guide ring 61 connected to wall 59 by radial webs 62. On the inside of the nose of wall 60 is a cylindrical flange 64 aligned with ring 61. The purpose of the flange 64 and ring 61 is to permit a pipe or rod to be inserted therethrough for lifting and fitting the valve in position within the valve housing in the installation of the valve.

It will now be understood that air is sucked through the valve when the pressure within the compressor is reduced permitting the arcual valve plates 45 to be pressed back thereby permitting gas to pass through the slots 21 and 38 into the compressor cylinder.

It will be observed that the arcual plates 45 have uniform opening and closing and will not scrape against the valve seat. Furthermore, since each valve plate 45 extends only partially around the valve seat it is not too cumbersome and there is no slip. Furthermore the valve plate 45 can be made of one suitable material while the spring 49 is made of another suitable material.

Referring now to Figs. 3 and 4 the valve head 10 also has a discharge or delivery valve 70 mounted within a cylindrical casing 71 communicating with an outlet passage 72. Compressed air or gas passes from the cylinder through the valve 70 into the discharge passage 72. The valve casing 71 is provided with an annular flange 73 which may be in alignment with the flange 15 of the suction valve. Flange 73 is formed with an opening or cylindrical surface 74. Received within opening 74 is a ring 76 formed with a flange 76a contacting the inner surface 75 of flange 73. Flange 73 is formed with a plurality of equiangularly spaced threaded openings 73a.

Means is provided for attaching the ring 76 to flange 73. To this end there is provided a flange 77. The same has a flat annular wall 78 and a curved shoulder 79 extending therefrom. Wall 78 contacts flange 76a. The curved shoulder 79 extends around the flange 76. Wall 78 is formed with through openings 80. Extending through the registering openings 80, 73a, are studs 81 screwed to the openings 73a. On said studs are lock washers 81a. Screwed to the free ends of studs 81 are cap screws 82. Ring 76 is formed with an internal screw threaded portion 83 and with an internal shoulder 73a. Screwed to the ring is a valve seat member 84. Said valve seat member comprises a cylindrical wall 85 formed with a screw threaded portion 86 screwed within the screw threaded opening 83 of ring 86.

On cylindrical wall 85 is an annular flange 87. Cylinder 84 is furthermore formed with a plurality of circular rows of arcual slots 89 forming ribs 90 therebetween and longitudinal interconnecting webs 91. At the opposite end of wall 85 is an enlarged flange 87a similar to flange 87. At the end of wall 85 are a plurality of screw threaded openings 94 parallel to the axis of said wall.

Telescoped on member 84 is a valve guard member 96. Member 96 is cylindrical in shape and has end portions 97 and 98 engaging flanges 87 and 87a respectively. Between the end portions 97, 98 are a plurality of circular sets of arcual slots 99 forming ribs 100 therebetween. The ribs 100 are interconnected by longitudinal web portions 102 aligned with webs 91. The slots 99 are aligned with the ribs 90. There is a cylindrical space between the ribs 100 and the ribs 90 and disposed within said space are arcual valve plates 103 overlying each slot 89.

Each arcual valve plate 100 is adapted to overlap the outer surfaces of a pair of adjacent ribs 90 which serve as valve seats. Interposed between each arcual valve plate 103 and rib 100 is a sinuous valve spring 106. Each spring 106 has a central portion and end portions contacting the valve plate 103, and a pair of humped portions contacting the inner surfaces of rib 100. The outer surfaces of the webs 91 are drilled with openings 107 to receive pins 108 adapted to contact the side edges and ends of the valve plates 103 and springs 106 to prevent either peripheral or side shifting thereof.

At one end of member 96 is an inwardly extending flange 109 contacting an end of member 84 and formed with through openings 109a aligned with the screw threaded openings 94. Screwed within said screw threaded openings 94 and passing through openings 109a are bolts 109b.

Mounted on member 84 is a filler member 110 formed with a flange 111 having through openings 111a receiving the bolts 109b therethrough. Nuts 111b on said bolts serve to attach the filler to the valve and also to fix the valve guard. The filler further comprises a wall 113 shaped like the nose of a shell and projecting into the valve. Said wall has a cylindrical surface 114 contacting the inner surface of the end portion of member 84 for centering the filler. The filler furthermore is provided at one end with an annular ring 115 connected to wall 113 by radial webs 116. At the inside of the nose is a cylindrical flange 117 aligned with ring 115. The purpose of the cylindrical flange 117 of the ring 115 is also for insertion of a rod or pipe to facilitate lifting the valve in place for installation. Ring 76 may be provided with a radial screw threaded opening 76c to receive a set screw 76d for retaining member 84 against movement relative to said ring.

In Figs. 5, 6 and 7 there is shown a suction valve embodying the invention and illustrating a modified form thereof. In said figures there is shown a suction valve 120 attached to flange 15 of valve head 10. Flange 15 is formed as described hereinabove, with screw threaded openings 16 equiangularly spaced around said flange. Said flange has a central opening 15a and an inner surface 15b. Attached to flange 15 is a frame 121 comprising front and rear annular end portions 122 and 123 interconnected by longitudinal ribs 124. Annular portion 122 has an inwardly extending rim 125, a cylindrical wall portion 126, and an outwardly extending rim or flange 128. The cylindrical wall 126 fits within opening 15a. Flange 128 contacts shoulder or surface 15b. Flange 125 is formed with an internal shoulder 129 for the purpose hereinafter appearing.

Annular portion 123 is formed with angularly spaced longitudinal screw openings 130. The frame 121 is attached to flange 15b by studs 31, flange 28, and cap screws 32, the same as shown in Fig. 1 of the drawing.

Telescoped within the frame 134 is a valve seat member 135. The same comprises a metal tube formed with circular rows of spaced sets of openings 136. Between the sets of openings in said circular rows are portions 136a, which do not have holes in them, thus forming longitudinal ribs between arcual rows of openings. One end of tube 135 contacts shoulder 139, whereas the other end thereof contacts the inner cylindrical surface 123a of annular portion 123 of frame 121. The ribs 124 are somewhat spaced from the tube, which is centered by the shoulder 129 and surface 123a. Ribs 124 are aligned with portion 136a of tube 135. The openings of each set form an arcual valve opening, as will appear hereinafter.

Gaskets 137 of triangular cross-section may be inserted in beveled corners formed at the ends of tube 135 if desired. The inner ends of openings 136 may be countersunk as shown in the drawing.

Attached to frame 123 is a filler member 140. The same comprises an end wall 141 having a flange 142 contacting the rear end of frame 121. Flange 142 is formed with openings 143 registering with the screw threaded openings 130 in the frame. Bolts 144 pass through openings 143 and are screwed into openings 130 for attaching the filler to the frame.

Extending from the rear wall 141 is a tapered wall 146 shaped like the nose of a shell and projecting into the tube 135. Extending from wall 146 are a plurality of radial webs 147 having outer longitudinal surfaces 148 curved transversely and all disposed within a common cylindrical plane spaced from the inner surface of tube 135.

Mounted on each surface 148 is a longitudinal valve guide member 150. Each valve guide member 150 is attached to a web 147 by flat head screws 151 or other fastening means at the ends thereof. Member 150 is provided with a plurality of transverse slots 152. The slots 152 are aligned with the rows of openings 136. It will be noted that portions 136a of tube 135 are in alignment with the valve guides 150. The bottom surfaces of slots 152 are formed with central drilled openings in which are press fitted upstanding pins 153 projecting upwardly into said slots 152. Contacting the inner surface of tube 135 are arcual valve ribbon plates 154, each underlying the arcual row of openings 136. The ends of each valve plate 154 engage within slots 152 of a pair of adjacent valve guides 150. The pins 153 serve to prevent endwise movement of the valve plates, whereas side shifting of the valve plates is prevented by the side walls of slots 152.

Also mounted between the valve guides 150 are annular valve plate supports 155, which are also received in slots 152. Interposed between arcuate valve plates 154 and the valve supports 155 are sinuous shaped springs 156 serving to bias the valve plates 154 against the valve openings 136.

It will now be understood that the pins 153 are interposed between adjacent sets of valve plates and springs. Said pins pass through holes in the valve plate support. It will now be understood that when the pressure in the cylinder is below that in the entrance passage, the valve plates 154 will be pressed back against the springs 156 to permit passage of air or gas through the valve openings 136.

It will be noted that the frame member 121 and valve seat are two separate members. The advantage of this construction is that the valve seat can be made of wear-resisting material such as stainless steel. There is furthermore, a great saving and simplification in machining, in the construction of Figs. 5, 6 and 7, since the valve seat member can be made of tubular stock.

In Figs. 8 and 9 there is shown a discharge valve embodying the invention and illustrating a modified form thereof. In Figs. 8 and 9 there is shown a discharge valve 160 mounted in valve casing 71. The valve casing 71 as described hereinabove, has an annular flange 73 formed with an annular opening 74 and an internal surface 75. Attached to flange 73 is a frame 121a substantially similar to frame 121 shown in Fig. 5. The same comprises annular end members 162 and 163 interconnected by longitudinal ribs 164, and said frame is attached to flange 73 by means of studs 30, flange 38, and cap nuts 32 in the same manner as illustrated in Figs. 5, 6 and 7 of the drawing.

Attached to frame 121a is a filler member 165 comprising a back wall 166 formed with an outwardly extending flange 167 contacting annular portion 163 of the frame. The filler is attached to the frame by means of bolts 168 passing through openings 167a in flange 167, and screwed within threaded openings 163a in annular rim or ring 163. The filler 165 is formed with a tapered shell or wall 170 extending from wall 166. On the inner side of flange 167 is annular groove 172 forming an internal cylindrical surface 173. Portion 162 of frame 121a is formed with an annular internal shoulder 174 forming a cylindrical surface 162a aligned with surface 173.

Fitted within groove 172 is one end of a tubular valve seat member 175. One end of said tubular member contacts surface 162a and fits within shoulder 174. Said valve seat member has beveled outer corners to receive gaskets 176. Said valve seat member is attached to ring 162 by means of aligning screws 177. It is formed with circular rows of arcual sets of openings 178. The rows of openings 178 are interrupted by portions 179 which do not have openings, said portions being aligned with the ribs 164 of frame 121a, thus forming arcual rows of valve openings for the purpose hereinafter appearing.

Attached to and superimposed on the inner surface of ribs 164 are longitudinal valve guide members 180 each formed with a plurality of transverse slots 181 aligned with the segmental rows of openings 178. Each valve guide member 180 is attached to frame 121a by means of a pair of long rivets 182 passing through the bottom surface 181a of an end slot 181 and through annular portion 163 of said frame member; and also by means of a pair of short rivets 185 passing through the bottom surface of a slot 181 at the other end of the valve guide member, and passing through the portion 162 of said frame member. The bottoms of the slots 181 are furthermore formed with central drilled through openings 186, and press fitted therein are radial pins 187 projecting outwardly into said slots.

Supported and guided by the valve guide members 180 are arcual valve plates 190, each overlying an arcual row or set of openings 178. The ends of each valve plate are received within slots 181 of a pair of adjacent valve guide members 180. The pins 187 prevent endwise shifting of the valve plates 190. Side shifting of the valve plates is prevented by side walls of the slots 181.

Also supported by and between the valve guides 180 are annular backing supports 191 extending through the slots 181.

Interposed between plates 190, 191 are sinuous shaped springs 192 which serve to bias the valve plates 190 against the valve seat member to close the valve openings 178. When pressure within the compressor cylinder exceeds a predetermined pressure, the valve plates will open permitting passage of air or gas through the openings 178.

It will thus be seen that there is provided a device in which the several objects of this invention are achieved, and which is well adapted to meet the conditions of practical use.

As various possible embodiments might be made of the above invention, and as various changes might be made in the embodiment above set forth, it is to be understood that all matter herein set forth as shown in the accompanying drawing is to be interpreted as illustrated and not in a limiting sense.

Having thus described our invention, we claim as new and desire to secure by Letter Patent:

A valve comprising telescoping cylindrical valve seat and valve guard members, said valve guard and valve seat members having cylindrical contacting surfaces at the ends thereof and concentric spaced intermediate portions, said valve seat member being formed with peripherally arranged arcual openings, said valve guard being formed with ribs aligned with said arcual valve openings, arcual valve plates to close said openings, a separate spring for each valve plate, said springs being interposed between the valve plates and the ribs, a filler member within the inner of said members, having a nose portion projecting into said inner of said members, said valve seat member, valve guard member, and filler having flanges formed with registering openings, and fastening means extending through said openings for attaching the filler, valve guard member, and valve seat member together.

ARTHUR SELIGMANN.
KARL W. SCHARTEL.

REFERENCES CITED

The following references are of record in the file of this patent:

UNITED STATES PATENTS

| Number | Name | Date |
|---|---|---|
| 1,968,805 | Belyavin | Aug. 7, 1934 |
| 1,693,619 | Sandford | Dec. 4, 1928 |
| 2,297,944 | Collins | Oct. 6, 1942 |
| 1,720,993 | Belyavin | July 16, 1929 |
| 1,911,939 | Belyavin | May 30, 1933 |
| 1,324,137 | Wikander | Dec. 9, 1919 |
| 1,414,665 | Parsons | May 2, 1922 |
| 878,904 | Slick | Feb. 11, 1908 |
| 1,829,954 | Erskine | Nov. 3, 1931 |
| 1,413,059 | Riesner | Apr. 18, 1922 |

FOREIGN PATENTS

| Number | Country | Date |
|---|---|---|
| 630,363 | Germany | May 26, 1936 |
| 34,290 | Germany | Jan. 5, 1886 |